US011997742B2

(12) United States Patent
Jiang

(10) Patent No.: US 11,997,742 B2
(45) Date of Patent: May 28, 2024

(54) METHOD FOR RECEIVING SYSTEM INFORMATION, METHOD FOR SENDING SYSTEM INFORMATION, AND DEVICES AND STORAGE MEDIA THEREOF

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 326 days.

(21) Appl. No.: 17/441,695

(22) PCT Filed: Mar. 21, 2019

(86) PCT No.: PCT/CN2019/079126
§ 371 (c)(1),
(2) Date: Sep. 21, 2021

(87) PCT Pub. No.: WO2020/186527
PCT Pub. Date: Sep. 24, 2020

(65) Prior Publication Data
US 2022/0167458 A1    May 26, 2022

(51) Int. Cl.
*H04W 56/00*    (2009.01)
*H04W 76/27*    (2018.01)
(52) U.S. Cl.
CPC .................................. *H04W 76/27* (2018.02)
(58) Field of Classification Search
CPC ...................................................... H04W 76/27
(Continued)

(56) References Cited

U.S. PATENT DOCUMENTS

2020/0275446 A1*   8/2020   Kim ...................... H04W 72/02
2021/0044408 A1*   2/2021   Kubota ................. H04W 72/21
2023/0308989 A1*   9/2023   Babaei .............. H04W 74/0833
                                                              370/329

FOREIGN PATENT DOCUMENTS

CN    106797604 A    5/2017
CN    108496317 A    9/2018
(Continued)

OTHER PUBLICATIONS

International Search Report of PCT/CN2019/079126 dated Dec. 25, 2019 with English translation (4p).
(Continued)

*Primary Examiner* — Sai Ming Chan
(74) *Attorney, Agent, or Firm* — Arch & Lake LLP

(57) ABSTRACT

The present disclosure provides a method for receiving system information, a method for sending system information, and devices and storage media thereof. The method for receiving system information, applied to a terminal, includes: sending, by the terminal, an SI request to a base station on a first BWP, where the SI request is used to request to obtain system information; receiving, by the terminal, first switching information sent by the base station, where the first switching information is used to instruct the terminal to switch to a second BWP to receive the system information; receiving, by the terminal, the system information on the second BWP; and after successfully receiving the system information, sending, by the terminal, first indication information to the base station, where the first indication information is used to indicate that the terminal has successfully received the system information.

21 Claims, 9 Drawing Sheets

(58) Field of Classification Search
USPC .......................................................... 370/329
See application file for complete search history.

(56) References Cited

FOREIGN PATENT DOCUMENTS

| CN | 109392173 A | | 2/2019 |
|---|---|---|---|
| CN | 109474994 A | | 3/2019 |
| KR | 20190100042 | * | 8/2019 |
| WO | 2018112837 A1 | | 6/2018 |
| WO | 2018128427 A | | 7/2018 |
| WO | WO 2019138297 | * | 7/2019 |
| WO | WO 2019139525 | * | 7/2019 |

OTHER PUBLICATIONS

First Office Action issued to Chinese Application No. 201980000530.7, dated Nov. 26, 2020 with English translation, (9p).
3GPP TS 36.321 v15.11.0 (Dec. 2020)—3rd Generation Partner Project, Technical Specification Group Radio Access Network; Evolved Universal Terrestrial Radio Access (E-UTRA); Medium Access Control (MAC) protocol specification (Release 15), (134p).
3GPP TS 36.331 v15.12.0 (Dec. 2020)—3rd Generation Partner Project, Technical Specification Group Radio Access Network; Evolved Universal Terrestrial Radio Access (E-UTRA); Radio Resource Control (RRC); pratacol specification (Release 15), (961p).

* cited by examiner

METHOD FOR RECEIVING SYSTEM INFORMATION, METHOD FOR SENDING SYSTEM INFORMATION, AND DEVICES AND STORAGE MEDIA THEREOF

CROSS-REFERENCE TO RELATED APPLICATION

This application is the U.S. national phase of PCT Patent Application No. PCT/CN2019/079126 filed on Mar. 21, 2019, the entire content of which is incorporated herein by reference in its entirety for all purposes.

TECHNICAL FIELD

The present disclosure relates to the field of communication technology, and in particular to a method for receiving system information, a method for sending system information, and devices and storage media thereof.

BACKGROUND

System information (SI) is information used by a base station to inform a terminal about cell configuration, by which the terminal can learn how the cell corresponding to the base station is configured, such that it can operate correctly within the coverage of the cell. System information includes MIB (Master Information Block) messages and SIB (System Information Block) messages, wherein the SIB messages include SIB 1 message, SIB 2 message, SIB 3 message, etc., and different SIB messages contain different configuration information.

In the 5G NR (New Radio) system, the system information can be divided into two types. The first type of system information can be called minimum SI, and the first type of system information can include MIB messages and SIB 1 messages. The second type of system information can be called other SI, and the second type of system information can include SIB 2 messages, SIB 3 messages, etc. For the first type of system information, the terminal does not need to request it, and the base station sends it to the terminal through broadcast. For the second type of system information, the terminal can obtain it only after requesting the base station.

In addition, in the 5G NR system, the concept of BWP (Bandwidth Part) is introduced, that is, for a terminal, a frequency band is divided into several BWPs, and the terminal is configured with a plurality of BWPs in a period of time, and the terminal can transmit information on one or more active BWPs.

For the BWP scenario, how to send and receive system information between the terminal and the base station is an urgent problem to be solved.

SUMMARY

The examples of the present disclosure provide a method for receiving system information, a method for sending system information, and devices and storage media thereof. The technical solutions are as follows:

According to a first aspect of the present disclosure, there is provided a method for receiving system information, and the method includes: sending, by a terminal, a system information (SI) request to a base station on a first bandwidth part (BWP), wherein the SI request requests to obtain system information; receiving, by the terminal, first switching information sent by the base station, wherein the first switching information instructs the terminal to switch to a second BWP to receive the system information; receiving, by the terminal, the system information on the second BWP; and in response to successfully receiving the system information, sending, by the terminal, first indication information to the base station, wherein the first indication information indicates that the terminal has successfully received the system information.

According to a second aspect of the present disclosure, there is provided a method for sending system information, and the method includes: receiving, by a base station, a system information (SI) request sent by a terminal on a first bandwidth part (BWP), wherein the SI request requests to obtain system information; sending, by the base station, first switching information to the terminal, wherein the first switching information instructs the terminal to switch to a second BWP to receive the system information; sending; by the base station, the system information on the second BWP through broadcast; and receiving, by the base station, first indication information sent by the terminal, wherein the first indication information indicates that the terminal has successfully received the system information.

According to a third aspect of the present disclosure, there is provided a device for receiving system information, and the device is applied to a terminal. The device includes: a processor; and a memory for storing executable instructions of the processor; wherein the processor is configured to: send a system information (SI) request to a base station on a first bandwidth part (BWP), wherein the SI request requests to obtain system information; receive first switching information sent by the base station; wherein the first switching information instructs the terminal to switch to a second BWP to receive the system information; receive the system information on the second BWP; and send first indication information to the base station in response to successfully receiving the system information, wherein the first indication information indicates that the terminal has successfully received the system information.

According to a fourth aspect of the present disclosure, there is provided a device for sending system information, and the device is applied to a terminal. The device includes: a processor; and a memory for storing executable instructions of the processor; wherein the processor is configured to: receive a system information (SI) request sent by the terminal on a first bandwidth part (BWP), wherein the SI request requests to obtain system information; send first switching information to the terminal, wherein the first switching information instructs the terminal to switch to a second BWP to receive the system information; send the system information on the second BWP through broadcast; and receive first indication information sent by the terminal, wherein the first indication information indicates that the terminal has successfully received the system information.

It should be understood that the above general description and the following detailed description are only exemplary and explanatory, and cannot limit the present disclosure.

BRIEF DESCRIPTION OF THE DRAWINGS

The accompanying drawings here are incorporated into the specification, constitute a part of the specification, show examples in accordance with the present disclosure, and together with the specification are used to explain the principle of the present disclosure.

DETAILED DESCRIPTION

Figure 1:
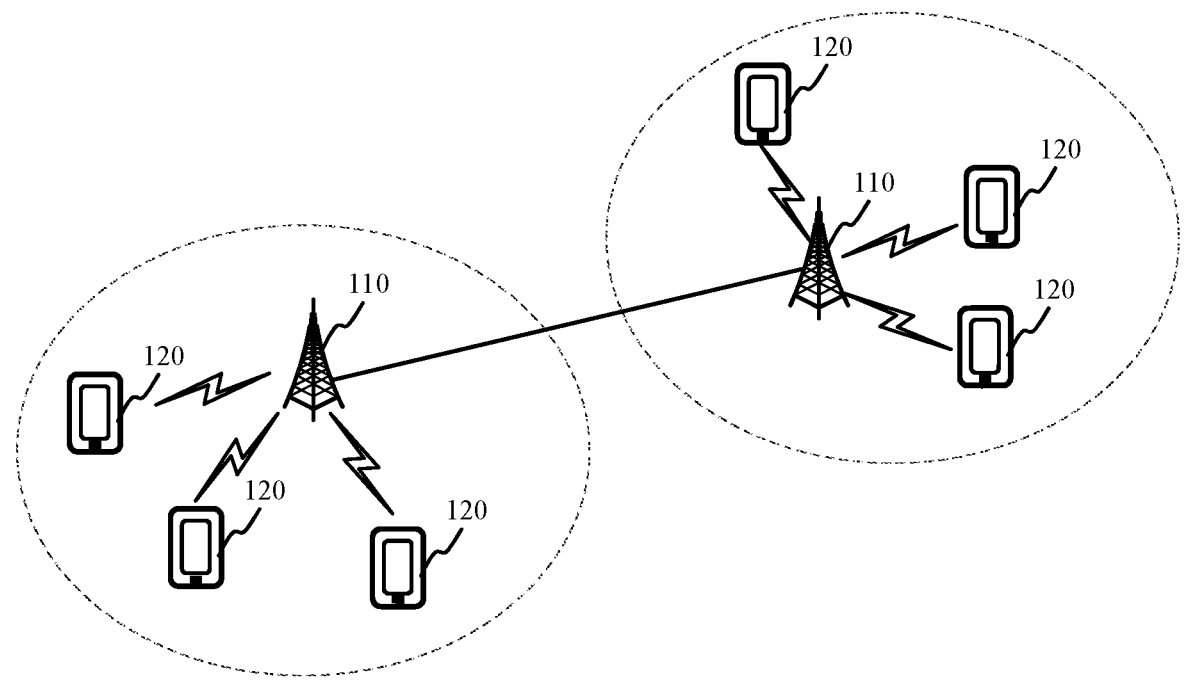
FIG. 1 is a schematic diagram showing a network architecture according to one or more examples of the present disclosure.

The exemplary embodiments will be described in detail here, and examples thereof are shown in the accompanying drawings. When the following description refers to the drawings, unless otherwise indicated, the same numbers in different drawings indicate the same or similar elements. The implementation manners described in the following examples do not represent all implementation manners consistent with the present disclosure. Rather, they are merely examples of devices and methods consistent with some aspects of the present disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The network architecture and business scenarios described in the examples of the present disclosure are intended to more clearly illustrate the technical solutions of the examples of the present disclosure, and do not constitute a limitation on the technical solutions provided by the examples of the present disclosure. Those of ordinary skill in the art will know that with the evolution of the network architecture and the emergence of new business scenarios, the technical solutions provided in the examples of the present disclosure are equally applicable to similar technical problems.

FIG. 1 is a schematic diagram showing the network architecture according to an example of the present disclosure. The network architecture may include: a base station 110 and a terminal 120.

The base station 110 is deployed in an access network. The access network in the 5G NR system can be called NG-RAN (New Generation-Radio Access Network). The base station 110 and the terminal 120 communicate with each other through a certain air interface technology, for example, may communicate with each other through cellular technology.

The base station 110 is a device deployed in an access network to provide the terminal 120 with a wireless communication function. The base station 110 may include various forms of macro base stations, micro base stations, relay stations, access points, and so on. In systems using different wireless access technologies, the names of devices with base station functions may be different. For example, in 5G NR systems, they are called gNodeB or gNB. As communication technology evolves, the name "base station" may change. For ease of description, in the examples of the present disclosure, the above-mentioned devices for providing wireless communication functions for the terminal 120 are collectively referred to as base stations.

There are usually a plurality of terminals 120, and one or more terminals 120 may be distributed in a cell managed by each base station 110. The terminal 120 may include various handheld devices, vehicle-mounted devices, wearable devices, computing devices or other processing devices connected to a wireless modem, as well as various forms of user equipment (UE), mobile stations (MS), terminal device, etc., with wireless communication functions. For ease of description, in the examples of the present disclosure, the above-mentioned devices are collectively referred to as terminals.

The "5G NR system" in the examples of the present disclosure may be referred to as a 5G system or an NR system as well, but those skilled in the art can understand its meaning. The technical solutions described in the examples of the present disclosure may be applicable to the 5G NR system, and may be applicable to the subsequent evolution systems of the 5G NR system as well.

Figure 2:
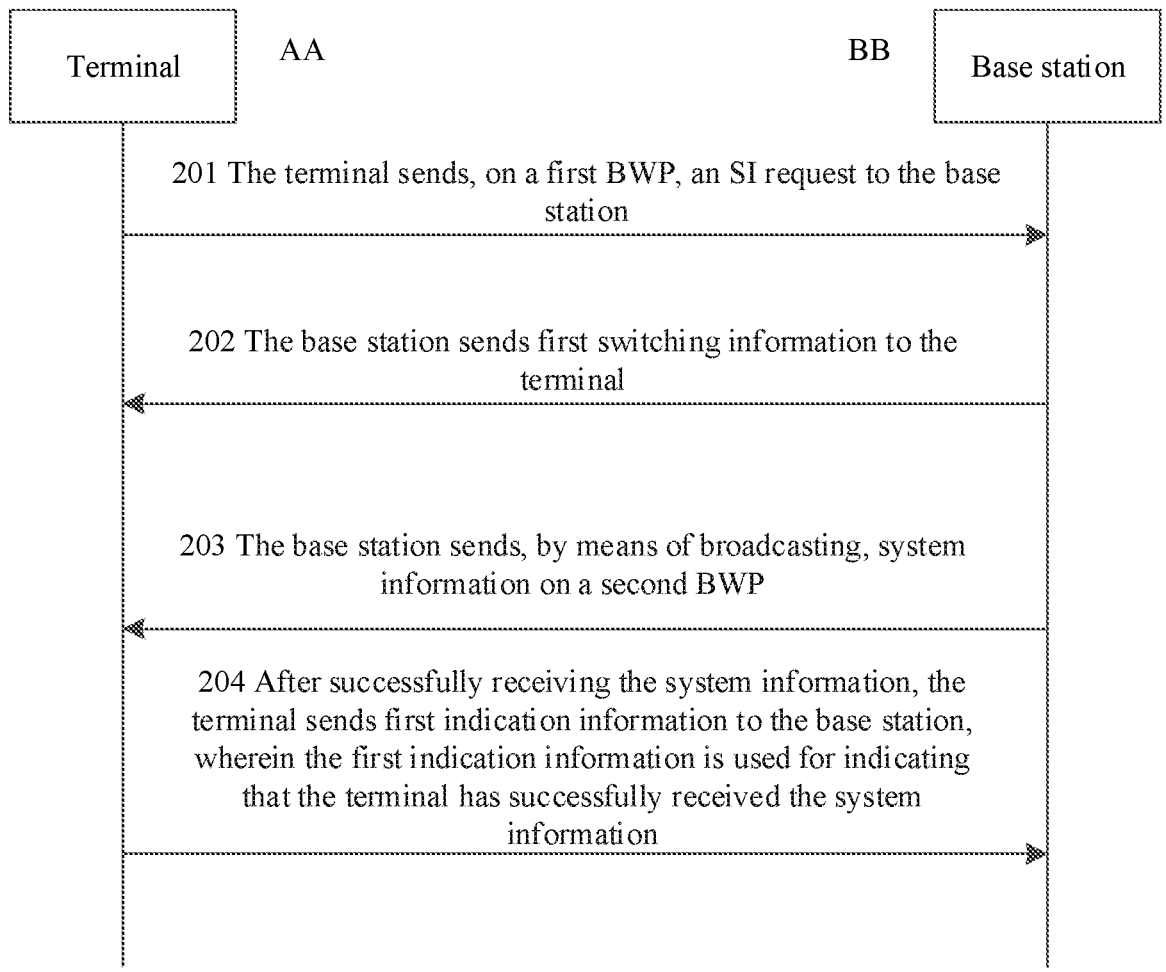
FIG. 2 is a flow chart showing a method for receiving system information according to one or more examples of the present disclosure.

FIG. 2 is a flow chart showing a method for receiving system information according to an example of the present disclosure. This method can be applied to the network architecture shown in FIG. 1. The method can include the following steps (201~204).

In step 201, the terminal sends an SI request to the base station on a first BWP.

The first BWP can be any one activated BWP. In the NR system, a carrier bandwidth can be divided into a plurality of BWPs, and a terminal can be configured with a plurality of BWPs at the same time, but the terminal can only have one active BWP on a carrier at one time. If the terminal is configured with a plurality of carriers, each carrier can have an activated BWP.

SI request is used to request system information. Optionally, the SI request carries an identifier of the system information requested to be obtained, so as to inform the base station which system information the terminal needs to obtain.

In step 202, the base station sends first switching information to the terminal.

For the system information requested by the terminal, if the base station does not send the system information on the first BWP, but sends the system information on a second BWP, the base station may send the first switching information to the terminal, and the first switching information is used to instruct the terminal to switch to the second BWP to receive the above system information, wherein, the second BWP is different from the first BWP.

Optionally, the first switching information includes identification information of the second BWP. The identification information of the second BWP is used to uniquely indicate the second. BWP, and different BWPs have different identification information.

In addition, the base station may send the first switching information to the terminal in the following manner:

In a possible implementation manner, the base station sends an SI response to the terminal, and the SI response carries the first switching information. In addition, if all the system information requested by the terminal in the SI request will be sent through broadcast, the SI response sent by the base station to the terminal does not carry the system information requested by the terminal. If a part of the system information requested by the terminal in the SI request will be sent through broadcast, and the other part of the system information will be sent through a directional manner, the SI response sent by the base station to the terminal can carry the other part of the system information and carry the first switching information at the same time.

In another possible implementation manner, the base station sends PDCCH scheduling information for scheduling the SI response, to the terminal, and the PDCCH scheduling information carries the first switching information. Before sending the SI response to the terminal, the base station may first send the PDCCH scheduling information for scheduling the SI response, to the terminal. For example, the PDCCH scheduling information contains time-frequency resources occupied by the SI response, such that the terminal receives the SI response sent from the base station at appropriate time-frequency resource location according to the PDCCH scheduling information. Therefore, the first switching information may be carried in the PDCCH scheduling information as well, such that the terminal can obtain the first switching information earlier.

In some other possible implementation manners, the base station may send the first switching information to the terminal through separate signaling as well, or the first switching information may be carried in other signaling and sent, which is not limited in the example of the present disclosure.

Optionally, the base station sends the first switching information to the terminal on the first BWP. Accordingly, the terminal receives the first switching information sent by the base station on the first BWP.

In addition, if all or part of the system information requested by the terminal needs to be sent through broadcast and not sent through a directional manner, the base station may let transmission indication information to be carried in the above SI response, and the transmission indication information is used to indicate that all or part of the system information requested by the terminal will be sent through broadcast. Alternatively, the base station may implicitly indicate to the terminal that all or part of the system information requested by the terminal will be sent through broadcast as well. For example, if all or part of the system information requested by the terminal is not carried in the SI response, the terminal determines all or part of the system information requested by the terminal will be sent through broadcast. In addition, if the base station indicates, in the SI response by the above explicit or implicit means, that all or part of the system information requested by the terminal will be sent through broadcast, the base station does not need to send an SIB 1 message to the terminal to inform the terminal whether the system information requested by the terminal will be sent through broadcast or through a directional manner before sending the system information requested by the terminal to the terminal. For example, the base station does not need to send the SIB 1 message to the terminal to indicate to the terminal whether the system information requested by the terminal will be sent through broadcast or through a directional manner by carrying a broadcast status in the SIB 1 message. Through the above manners, it is helpful to save signaling overhead.

In addition, for the system information requested by the terminal, if the base station will send the system information on the first BWP, for example, the base station will send the system information on the first BWP through broadcast, the base station does not need to send the first switching information to the terminal. If the terminal does not receive the first switching information sent by the base station, it does not need to switch the BWP. Alternatively, the base station sends BWP keeping information to the terminal. The BWP keeping information is used to indicate to keep the currently active BWP unchanged. If the terminal receives the BWP keeping information sent by the base station, the terminal does not switch the BWP and still receives the system information on the first BWP.

In step 203, the base station sends the system information on the second BWP through broadcast.

After sending the first switching information to the terminal, the base station sends the system information requested by the terminal on the second BWP through broadcast. Correspondingly, the terminal receives the system information on the second BWP.

It should be noted that since the terminal has learned through the SI response that the base station will send the system information to the terminal through broadcast, the terminal does not need to obtain the SIB 1 message to learn whether the system information requested by the terminal will be sent through broadcast or through a directional manner before receiving the system information on the second BWP.

In step 204, after successfully receiving the system information, the terminal sends first indication information to the base station, where the first indication information is used to indicate that the terminal has successfully received the system information.

In the example of the present disclosure, after successfully receiving the system information, the terminal sends the first indication information to the base station to inform the base station that the terminal has successfully received the system information, such that the base station can learn when the terminal completes the reception of the system information on the second BWP.

In addition, the terminal may send the first indication information to the base station in the following manner: In a possible implementation manner, the terminal sends RRC signaling to the base station, and the RRC signaling carries the first indication information. In another possible implementation manner, the terminal sends MAC CE signaling to the base station, and the MAC CE signaling carries the first indication information. In some other possible implementation manners, the base station may send the first indication information to the terminal through dedicated signaling as well, or may carry the first indication information in other signaling for sanding, which is not limited in the examples of the present disclosure.

To sum up, in the technical solution provided by the examples of the present disclosure, when the system information requested by the terminal will not be sent on the first BWP currently activated, but on the second BWP, the base station sends the first switching information to the terminal to instruct the terminal to switch to the second BWP to receive the above system information, ensuring the success rate of the terminal receiving system information in the BWP scenario. In addition, the terminal sends the first indication information to the base station after successfully receiving the system information, to indicate that the terminal has successfully received the system information, such that the base station can learn when the terminal completed the reception of the system information, and then provide assistance for BWP scheduling during subsequent data transmission.

Figure 3:
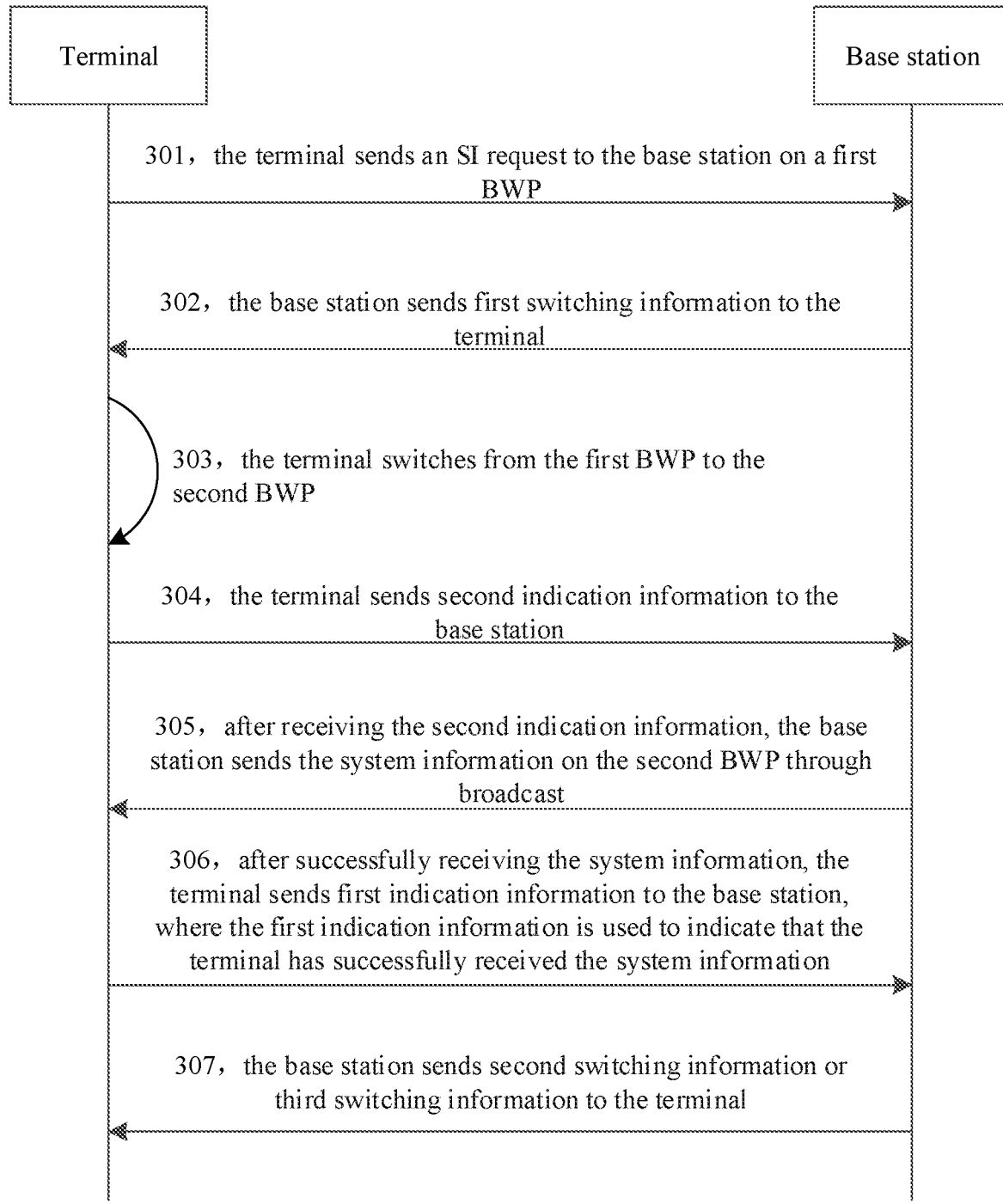
FIG. 3 is a flowchart showing a method for receiving system information according to one or more examples of the present disclosure.

FIG. 3 is a flowchart showing a method for receiving system information according to another example of the present disclosure. This method can be applied to the network architecture shown in FIG. 1. The method can include the following steps (301~307).

In step 301, the terminal sends an SI request to the base station on a first BWP.

The SI request is used to request system information. For example, the SI request is used to request to obtain an SIB 2 message, thus the SI request may carry an identifier of the SIB 2 message.

In step 302, the base station sends first switching information to the terminal.

The first switching information is used to instruct the terminal to switch to a second BWP to receive the above system information. Optionally, the first switching information includes identification information of the second BWP.

In addition, if the system information requested by the terminal will be sent on a second. BWP, the first switching information includes the identification information of this second BWP. If the system information requested by the terminal will be sent on a plurality of second BWPs, the first switching information includes identification information of each of the plurality of second BWPs, where the plurality of second BWPs are a plurality of different BWPs. Optionally, if the system information requested by the terminal will be sent on a plurality of second BWPs, the first switching information may include a mapping relationship between the identification information of the second BWPs and identification of the system information as well. Through the mapping relationship, the first switching information indicates to the terminal which system information is received on which BWP, such that the terminal can accurately receive the system information.

In step 303, the terminal switches from the first BWP to the second BWP.

After receiving the first switching information sent by the base station, the terminal switches from the first BWP to the second BWP, that is, the second BWP is used as an activated BWP.

Optionally, if the terminal still has any system information whose reception does not completed on the first BWP, the terminal switches from the first BWP to the second BWP after receiving the system information on the first BWP, so as to ensure the system information on the first BWP can be received completely and successfully.

In step 304, the terminal sends second indication information to the base station.

The second indication information is used to indicate that the terminal switched to the second BWP. The second indication information may be sent in an explicit manner or in an implicit manner. For example, after switching to the second BWP, the terminal sends a message, such as a random access request, RRC signaling, MAC CE signaling or uplink data, to the base station on the second BWP, to indicate that the terminal switched to the second BWP.

In step 305, after receiving the second indication information, the base station sends the system information on the second BWP through broadcast.

After confirming that the terminal switched to the second BWP, the base station sends the system information on the second BWP through broadcast, so as to ensure that the terminal can successfully receive the system information requested by the terminal on the second BWP.

In step 306, after successfully receiving the system information, the terminal sends first indication information to the base station, where the first indication information is used to indicate that the terminal has successfully received the system information.

For example, the terminal may send the first indication information to the base station through RRC signaling or MAC CE signaling.

In step 307, the base station sends second switching information or third switching information to the terminal.

After confirming that the terminal has successfully received the system information, the base station can determine whether the terminal still transmits data on the second BWP or switches to another BWP to transmit data, according to actual conditions.

Optionally, the base station sends the second switching information to the terminal, where the second switching information is used to instruct the terminal to switch to the first BWP to transmit data. Optionally, the second switching information includes identification information of the first BWP. Alternatively, the base station sends the third switching information to the terminal, where the third switching information is used to instruct the terminal to switch to a third BWP to transmit data. Optionally, the third switching information includes identification information of the third BWP, and the third BWP is another BWP different from the second BWP and the first BWP.

If the base station decides that the terminal is still transmitting data on the second BWP, the base station may not send information to the terminal, or send BWP keeping information to the terminal, which is used to indicate to keep the current activated BWP unchanged, after receiving the first indication information. Accordingly, if the terminal does not receive the information from the base station within a preset time period, or receives the BWP keeping information from the base station, after sending the first indication information, the terminal is still transmitting data on the second BWP.

To sum up, in the technical solution provided by the examples of the present disclosure, when the system information requested by the terminal will not be sent on the first BWP currently activated, but on the second BWP, the first switching information is sent to the terminal through the base station, so as to instruct the terminal to switch to the second BWP to receive the above system information, ensuring the success rate of the terminal receiving system information in the BWP scenario. In addition, after the terminal successfully receives the system information, the terminal sends the first instruction information to the base station, so as to indicate that the terminal has successfully received the system information, such that the base station can learn when the terminal completed the reception of the system information, and then provide assistance for BWP scheduling during subsequent data transmission.

In addition, after the terminal switches to the second BWP, it further sends the second indication information to the base station to inform the base station that the terminal switched to the second. BWP. After confirming that the terminal switched to the second BWP, the base station sends the system information on the second BWP, to ensure that the terminal can successfully receive the system information requested by the terminal on the second BWP.

In addition, after confirming that the terminal has successfully received the system information, the base station decides whether the terminal still transmits data on the second BWP or switches to another BWP to transmit data, according to the actual situation, which realizes the selection of suitable BWP to transmit business data according to business requirements, and improve system performance.

It should be noted that, in the above method example, the technical solution of the present disclosure is introduced and explained only from the perspective of the interaction between the terminal and the base station. The above-mentioned steps performed on the terminal side can be individually implemented as a method for receiving system information on the terminal side. The above-mentioned steps performed by the base station side can be individually implemented as a method for sending system information on the base station side.

The following are device examples of the present disclosure, which can be used to implement the method examples of the present disclosure. For details that are not disclosed in the device examples of the present disclosure, please refer to the method examples of the present disclosure.

Figure 4:
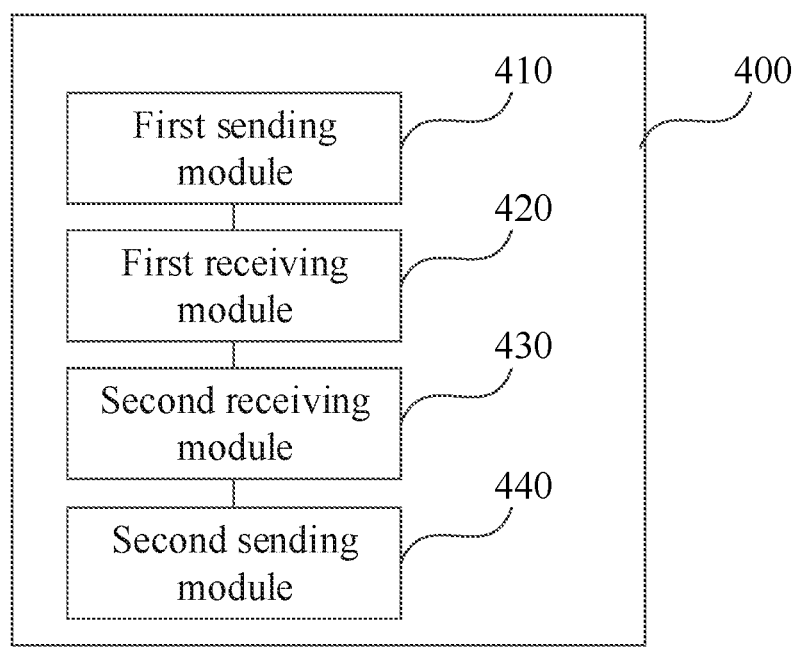
FIG. 4 is a block diagram showing a device for receiving system information according to one or more examples of the present disclosure.

FIG. 4 is a block diagram showing a device for receiving system information according to an example of the present disclosure. The device has the function of realizing the foregoing terminal-side method example, and the function can be realized by hardware, or by hardware executing corresponding software. The device can be the terminal described above, or it can be set in the terminal. As shown in FIG. 4, the device 400 may include: a first sending module 410, a first receiving module 420, a second receiving module 430, and a second sending module 440.

The first sending module 410 is configured to send an SI request to the base station on a first BWP, where the SI request is used to request to obtain system information.

The first receiving module 420 is configured to receive first switching information sent by the base station, where the first switching information is used to instruct the terminal to switch to a second BWP to receive the system information.

The second receiving module 430 is configured to receive the system information on the second BWP.

The second sending module 440 is configured to send first indication information to the base station after successfully receiving the system information, where the first indication information is used to indicate that the terminal has successfully received the system information.

To sum up, in the technical solution provided by the examples of the present disclosure, when the system information requested by the terminal will not be sent on the first BWP currently activated, but on the second BWP, the first switching information is sent to the terminal through the base station, so as to instruct the terminal to switch to the second BWP to receive the above system information, ensuring the success rate of the terminal receiving system information in the BWP scenario. In addition, the terminal sends the first indication information to the base station after successfully receiving the system information, so as to indicate that the terminal has successfully received the system information, such that the base station can learn when the terminal completed the reception of the system information, and then provide assistance for BWP scheduling during subsequent data transmission.

In an example, the second sending module 440 is configured to send RRC signaling to the base station, and the RRC signaling carries the first indication information. Alternatively, the second sending module 440 is configured to send MAC CE signaling to the base station, where the MAC CE signaling carries the first indication information.

Figure 5:
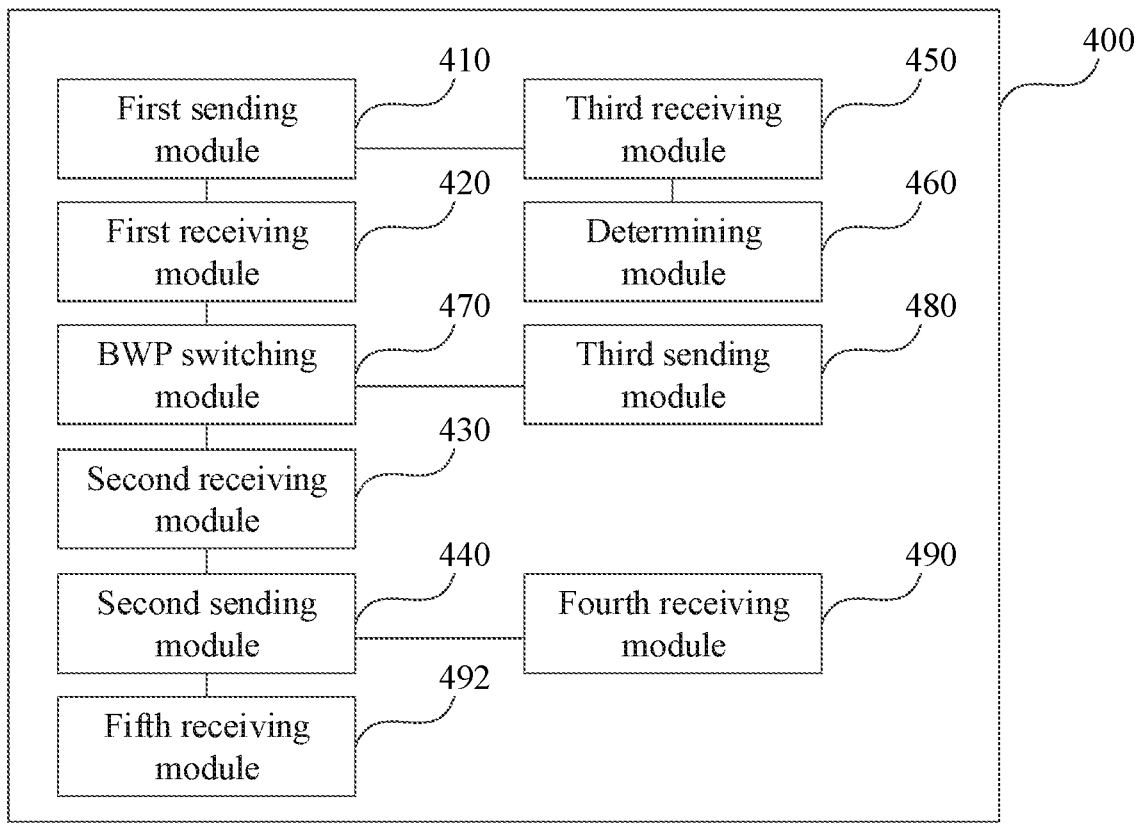
FIG. 5 is a block diagram showing a device for receiving system information according to one or more examples of the present disclosure.

In an example, as shown in FIG. 5, the device further includes: a third receiving module 450 and a determining module 460.

The third receiving module 450 is configured to receive an SI response sent by the base station.

The determining module 460 is configured to, when the SI response does not carry the system information, or the SI response carries transmission indication information for indicating that the system information will be sent through broadcast, determine that the base station will send the system information through broadcast.

In an example, as shown in FIG. 5, the device further includes: a BWP switching module 470.

The BWP switching module 470 is configured to switch from the first BWP to the second BWP after completing the reception of the system information on the first BWP.

In an example, as shown in FIG. 5, the device further includes: a third sending module 480.

The third sending module 480 is configured to send second indication information to the base station, where the second indication information is used to indicate that the terminal switched to the second BWP.

In an example, as shown in FIG. 5, the device further includes: a fourth receiving module 490 and/or a fifth receiving module 492.

The fourth receiving module 490 is configured to receive second switching information sent by the base station, where the second switching information is used to instruct the terminal to switch to the first BWP to transmit data.

The fifth receiving module 492 is configured to receive third switching information sent by the base station, where the third switching information is used to instruct the terminal to switch to a third BWP to transmit data.

Figure 6:
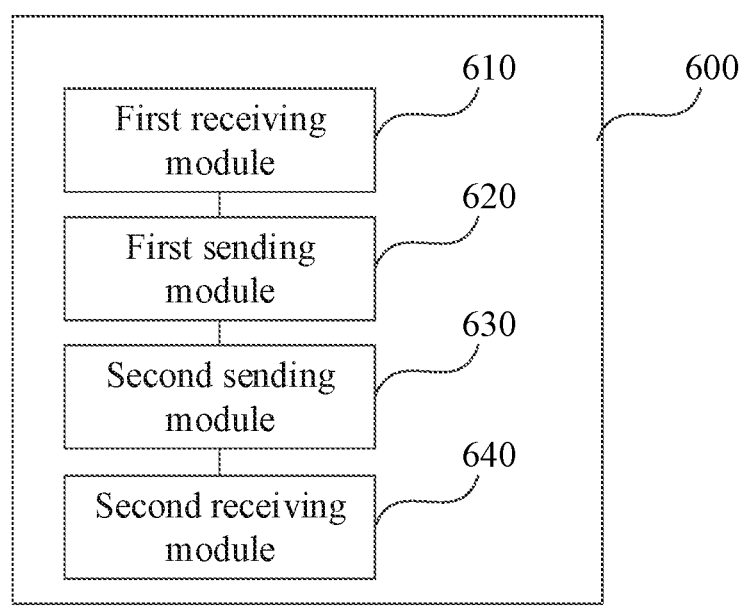
FIG. 6 is a block diagram showing a device for sending system information according to one or more examples of the present disclosure.

FIG. 6 is a block diagram showing a device for sending system information according to an example of the present disclosure. The device has the function of realizing the above example of the method on the base station side, and the function can be realized by hardware, or by hardware executing corresponding software. The device can be the base station described above, or it can be set in the base station. As shown in FIG. 6, the device 600 may include: a first receiving module 610, a first sending module 620, a second sending module 630, and a second receiving module 640.

The first receiving module 610 is configured to receive an SI request sent by the terminal on a first BWP, where the SI request is used to request to obtain system information.

The first sending module 620 is configured to send first switching information to the terminal, where the first switching information is used to instruct the terminal to switch to a second BWP to receive the system information.

The second sending module 630 is configured to send the system information on the second BWP through broadcast.

The second receiving module 640 is configured to receive first indication information sent by the terminal, where the first indication information is used to indicate that the terminal has successfully received the system information.

To sum up, in the technical solution provided by the examples of the present disclosure, when the system information requested by the terminal will not be sent on the first BWP currently activated, but on the second BWP, the first switching information is sent to the terminal through the base station, so as to instruct the terminal to switch to the second BWP to receive the above system information, ensuring the success rate of the terminal receiving system information in the BWP scenario. In addition, the terminal sends the first indication information to the base station after successfully receiving the system information, so as to indicate that the terminal has successfully received the system information, such that the base station can learn when the terminal completed the reception of the system information, and then provide assistance for BWP scheduling during subsequent data transmission.

In an example, the first sending module 620 is configured to send an SI response to the terminal, and the SI response carries the first switching information. Alternatively, the first sending module 620 is configured to send PDCCH scheduling information for scheduling the SI response, to the terminal, where the PDCCH scheduling information carries the first switching information.

In an example, the second sending module 630 is configured to send the system information on the second BWP through broadcast after receiving the second indication information sent by the terminal, and the second indication information is used to indicate that the terminal switched to the second BWP.

Figure 7:
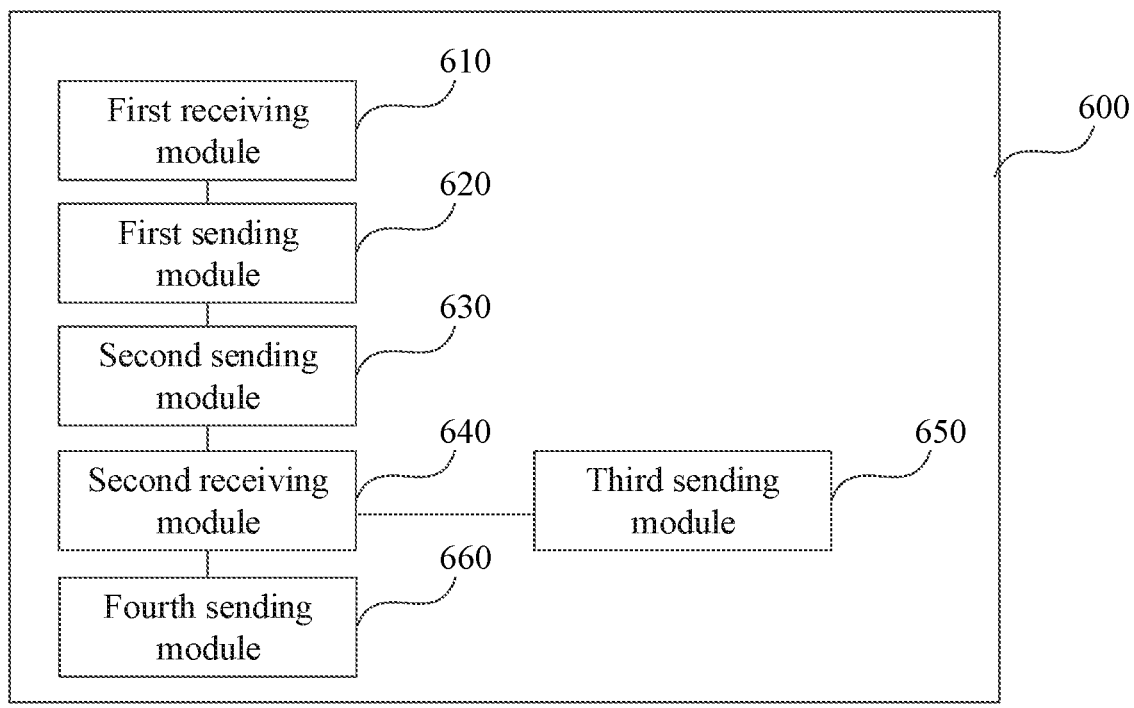
FIG. 7 is a block diagram showing a device for sending system information according to one or more examples of the present disclosure.

In an example, as shown in FIG. 7, the device further includes: a third sending module 650 and/or a fourth sending module 660.

The third sending module 650 is configured to send second switching information to the terminal, where the second switching information is used to instruct the terminal to switch to the first BWP to transmit data.

The fourth sending module 660 is configured to send third switching information to the terminal, where the third switching information is used to instruct the terminal to switch to a third BWP to transmit data.

It should be noted that, when the devices provided in the above examples realize their functions, the division of the above-mentioned functional modules is only used as an example for illustration. In actual applications, the above-mentioned functions can be allocated by different functional modules according to actual needs. That is, the content structure of the device is divided into different functional modules to complete all or part of the functions described above.

Regarding the devices in the foregoing examples, the specific manner in which each module performs operation has been described in detail in the example of the method, and detailed description will not be given here.

An example of the present disclosure further provides a system information receiving device, which can be applied to the terminal introduced above, and can implement the system information receiving method provided in the present disclosure. The device may include a processor, and a memory for storing executable instructions of the processor. The processor is configured to:

send an SI request to the base station on a first BWP, where the SI request is used to request to obtain system information;

receive first switching information sent by the base station, where the first switching information is used to instruct the terminal to switch to a second BWP to receive the system information;

receive the system information on the second BWP; and after successfully receiving the system information, send first indication information to the base station, where the first indication information is used to indicate that the terminal has successfully received the system information.

In an example, the processor is configured to:

send RRC signaling to the base station, where the RRC signaling carries the first indication information;

or, send MAC CE signaling to the base station, where the MAC CE signaling carries the first indication information.

In an example, the first switching information includes identification information of the second BWP.

In an example, the processor is further configured to:

receive an SI response sent by the base station; and when the SI response does not carry the system information, or the SI response carries transmission indication information for indicating that the system information will be sent through broadcast, determine that the base station will send the system information through broadcast.

In an example, the processor is further configured to:

after completing the reception of the system information on the first BWP, switch from the first BWP to the second BWP.

In an exemplary embodiment, the processor is further configured to:

send second indication information to the base station, where the second indication information is used to indicate that the terminal switched to the second BWP.

In an example, the processor is further configured to:

receive second switching information sent by the base station, where the second switching information is used to instruct the terminal to switch to the first BWP to transmit data;

or, receive third switching information sent by the base station, where the third switching information is used to instruct the terminal to switch to a third BWP to transmit data.

An example of the present disclosure further provides a system information sending device, which can be applied to the base station introduced above, and can implement the system information sending method provided in the present disclosure. The device may include a processor, and a memory for storing executable instructions of the processor. The processor is configured to:

receive an SI request sent by the terminal on a first BWP, where the SI request is used to request to obtain system information;

send first switching information to the terminal, where the first switching information is used to instruct the terminal to switch to a second BWP to receive the system information;

send the system information on the second. BWP through broadcast; and receive first indication information sent by the terminal, where the first indication information is used to indicate that the terminal has successfully received the system information.

In an example, the processor is further configured to:

sending an SI response to the terminal, where the SI response carries the first switching information;

or, send PDCCH scheduling information for scheduling the SI response, to the terminal, where the PDCCH scheduling information carries the first switching information.

In an example, the processor is further configured to:

after receiving the second indication information sent by the terminal, send the system information on the second BWP through broadcast, where the second indication information is used to indicate that the terminal switched to the second BWP.

In an example, the processor is further configured to:

send second switching information to the terminal, where the second switching information is used to instruct the terminal to switch to the first BWP to transmit data;

or, send third switching information to the terminal, where the third switching information is used to instruct the terminal to switch to a third BWP to transmit data.

The foregoing mainly introduces the solutions provided by the embodiments of the present disclosure from the perspective of the terminal and the base station. It can be understood that, in order to implement the above-mentioned functions, the terminal and the base station include hardware structures and/or software modules corresponding to the respective functions. In combination with the units and algorithm steps of the examples described in the embodiments disclosed in the present disclosure, the embodiments of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the embodiments of the present disclosure.

Figure 8:
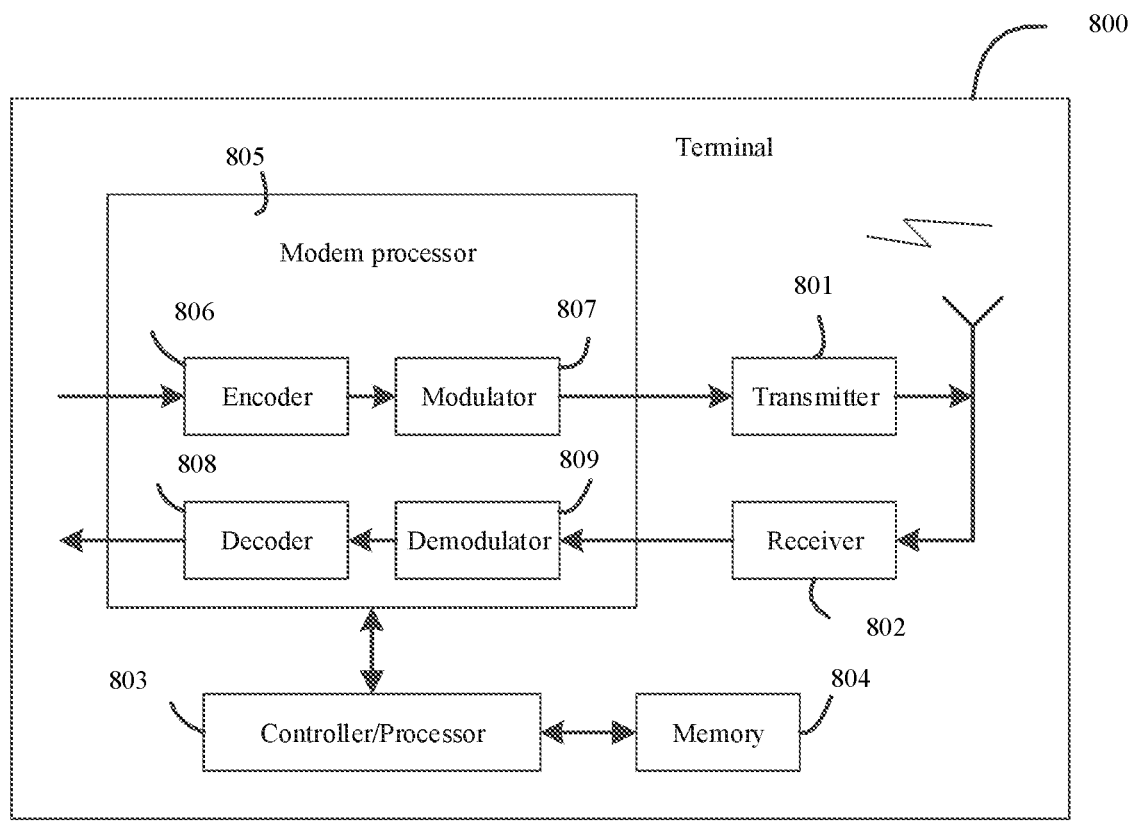
FIG. 8 is a schematic structural diagram showing a terminal according to one or more examples of the present disclosure.

FIG. 8 is a schematic structural diagram of a terminal according to an example of the present disclosure.

The terminal 800 includes a transmitter 801, a receiver 802 and a processor 803. The processor 803 may be a controller as well, which is represented as "controller/processor 803" in FIG. 8. Optionally, the terminal 800 may further include a modem processor 805, where the modem processor 805 may include an encoder 806, a modulator 807, a decoder 808, and a demodulator 809.

In one example, the transmitter 801 adjusts (e.g., analog conversion, filtering, amplification, and up conversion, etc.) the output samples and generates an uplink signal, which is transmitted to the base station via an antenna. On the downlink, the antenna receives the downlink signal transmitted by the base station. The receiver 802 adjusts (e.g., filters, amplifies, down-converts, and digitizes, etc.) the signal received from the antenna and provides input samples. In the modem processor 805, the encoder 806 receives service data and signaling messages to be sent on the uplink, and processes the service data and signaling messages (for example, formatting, encoding, and interleaving). The modulator 807 further processes (for example, symbol mapping and modulation) the encoded service data and signaling messages and provides output samples. The demodulator 809 processes (e.g., demodulates) the input samples and provides symbol estimates. The decoder 808 processes (e.g., deinterleaves and decodes) the symbol estimation and provides decoded data and signaling messages sent to the terminal 800. The encoder 806, the modulator 807, the demodulator 809, and the decoder 808 can be implemented by a synthesized modem processor 805. These units are processed according to the radio access technology adopted by the radio access network (for example, 5G NR and other evolving system access technologies). It should be noted that when the terminal 800 does not include the modern processor 805, the foregoing functions of the modem processor 805 may be performed by the processor 803 as well.

The processor 803 controls and manages the actions of the terminal 800, and is configured to execute the processing procedure performed by the terminal 800 in the foregoing example of the present disclosure. For example, the processor 803 is further configured to execute each step on the terminal side in the foregoing method example, and/or other steps of the technical solution described in the example of the present disclosure.

Further, the terminal 800 may further include a memory 804, and the memory 804 is configured to store program codes and data for the terminal 800.

It is understandable that FIG. 8 only shows a simplified design of the terminal 800. In practical applications, the terminal 800 may include any number of transmitters, receivers, processors, modem processors, memories, etc., and all terminals that can implement the examples of the present disclosure are within the protection scope of the examples of the present disclosure.

Figure 9:
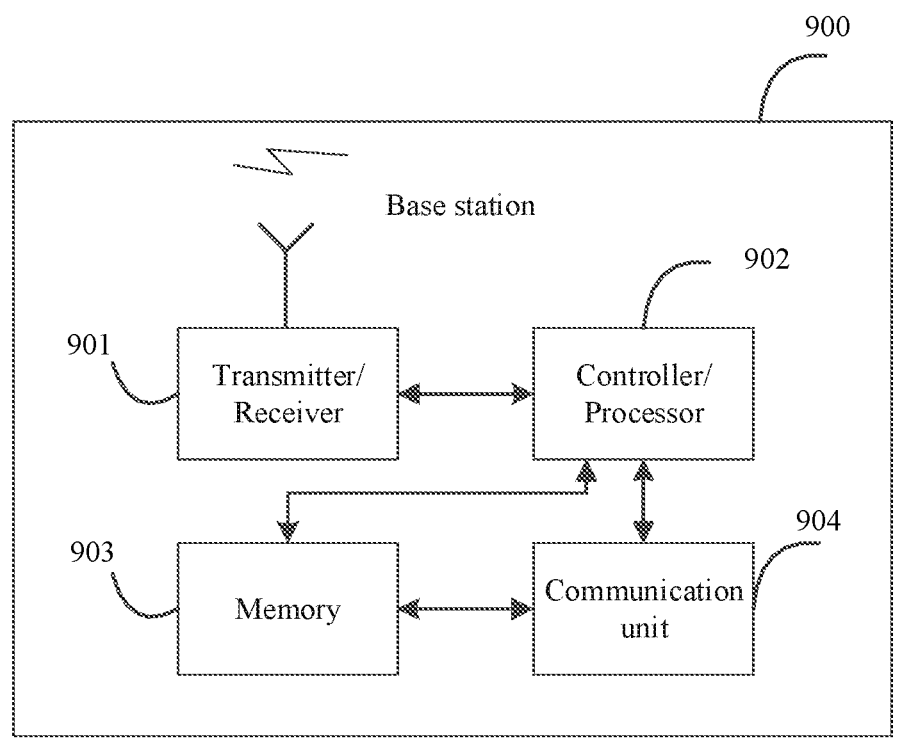
FIG. 9 is a schematic structural diagram of a base station according to one or more examples of the present disclosure.

FIG. 9 is a schematic diagram showing the structure of a base station according to an example of the present disclosure.

The base station 900 includes a transmitter/receiver 901 and a processor 902. The processor 902 may be a controller as well, which is represented as "controller/processor 902" in FIG. 9. The transmitter/receiver 901 is used to support the sending and receiving of information between the base station and the terminal in the foregoing example, and to support communication between the base station and other network entities. The processor 902 performs various functions for communicating with the terminal. In the uplink, the uplink signal from the terminal is received via the antenna, demodulated by the receiver 901 (for example, demodulating the high-frequency signal into a baseband signal), and further processed by the processor 902 to restore service data and signaling information sent by the terminal. On the downlink, service data and signaling messages are processed by the processor 902, and modulated by the transmitter 901 (for example, the baseband signal is modulated into a high-frequency signal) to generate a downlink signal, which is transmitted to the terminal via an antenna. It should be noted that the above-mentioned demodulation or modulation function may be completed by the processor 902 as well. For example, the processor 902 is further configured to execute each step on the base station side in the foregoing method example, and/or other steps of the technical solution described in the example of the present disclosure.

Further, the base station 900 may further include a memory 903, and the memory 903 is used to store program codes and data of the base station 900. In addition, the base station may further include a communication unit 904. The communication unit 904 is used to support the base station to communicate with other network entities (for example, network devices in the core network, etc.). For example, in a 5G NR system, the communication unit 904 may be an NG-U interface to support communication between the base station and a UPF (User Plane Function) entity; or, the communication unit 904 may be an NG-C Interface as well, used to support access to AMF (Access and Mobility Management Function) entities for communication.

It is understandable that FIG. 9 only shows a simplified design of the base station 900. In practical applications, the base station 900 may include any number of transmitters, receivers, processors, controllers, memories, communication units, etc., and all base stations that can implement the examples of the present disclosure are within the protection scope of the examples of the present disclosure.

The examples of the present disclosure further provide a non-transitory computer-readable storage medium, on which a computer program is stored, and when the computer program is executed by a processor of a terminal, the foregoing method for receiving system information on the terminal side can be realized.

The examples of the present disclosure further provide a non-transitory computer-readable storage medium, on which a computer program is stored, and when the computer program is executed by a processor of a base station, the above-mentioned method for sending system information on the base station side can be realized.

Optionally, the non-transitory computer-readable storage medium may be ROM (Read-Only Memory), RAM (Random Access Memory), CD-ROM, magnetic tape, floppy disk and optical data storage equipment, etc.

According to a first aspect of the present disclosure, there is provided a method for receiving system information, and the method includes:

sending, by a terminal, an SI request to a base station on a first BWP, where the SI request is used to request to obtain system information;

receiving, by the terminal, first switching information sent by the base station, where the first switching information is used to instruct the terminal to switch to a second BWP to receive the system information;

receiving, by the terminal, the system information on the second BWP; and after successfully receiving the system information, sending, by the terminal, first indication information to the base station, where the first indication information is used to indicate that the terminal has successfully received the system information.

Optionally, the said sending, by the terminal, first indication information to the base station includes:

sending, by the terminal, radio resource control RRC (Radio Resource Control) signaling to the base station, where the RRC signaling carries the first indication information;

or, sending, by the terminal, a MAC (Media Access Control) CE (Control Element) signaling to the base station, where the MAC CE signaling carries the first indication information.

Optionally, the first switching information includes identification information of the second BWP.

Optionally, the method further includes:

receiving, by the terminal, an SI response sent by the base station; and if the SI response does not carry the system information, or the SI response carries transmission indication information for indicating that the system information will be sent through broadcast, determining, by the terminal, that the base station will send the system information through broadcast.

Optionally, the method further includes:

switching, by the terminal, from the first BWP to the second BWP, after completing reception of the system information on the first BWP.

Optionally, the method further includes:

sending, by the terminal, second indication information to the base station, where the second indication information is used to indicate that the terminal switched to the second BWP.

Optionally, the method further includes:

receiving, by the terminal, second switching information sent by the base station, where the second switching information is used to instruct the terminal to switch to the first BWP to transmit data;

or, receiving, by the terminal, third switching information sent by the base station, where the third switching information is used to instruct the terminal to switch to a third BWP to transmit data.

According to a second aspect of the present disclosure, there is provided a method for sending system information, and the method includes:

receiving, by a base station, an SI request sent by a terminal on a first bandwidth part BWP, where the SI request is used to request to obtain system information;

sending, by the base station, first switching information to the terminal, where the first switching information is used to instruct the terminal to switch to a second BWP to receive the system information;

sending, by the base station, the system information on the second BWP through broadcast; and receiving, by the base station, first indication information sent by the terminal, where the first indication information is used to indicate that the terminal has successfully received the system information.

Optionally, the said sending, by the base station, first switching information to the terminal includes:

sending, by the base station, an SI response to the terminal, where the SI response carries the first switching information;

or, sending, by the base station, PDCCH (Physical Downlink Control Channel) scheduling information for scheduling the SI response, to the terminal, where the PDCCH scheduling information carries the first switching information.

Optionally, the said sending, by the base station, the system information on the second BWP through broadcast includes:

after receiving second indication information sent by the terminal, sending, by the base station, the system information on the second BWP through broadcast, where the second indication information is used to indicate that the terminal switched to the second BWP.

Optionally, the method further includes:

sending, by the base station, second switching information to the terminal, where the second switching information is used to instruct the terminal to switch to the first BWP to transmit data;

or, sending, by the base station, third switching information to the terminal, where the third switching information is used to instruct the terminal to switch to a third BWP to transmit data.

According to a third aspect of the present disclosure, there is provided a device for receiving system information, applied to a terminal, and the device includes:

a first sending module, configured to send a system information SI request to a base station on a first bandwidth part BWP, where the SI request is used to request to obtain system information;

a first receiving module, configured to receive first switching information sent by the base station, where the first switching information is used to instruct the terminal to switch to a second BWP to receive the system information;

a second receiving module, configured to receive the system information on the second BWP; and a second sending module, configured to send first indication information to the base station after successfully receiving the system information, where the first indication information is used to indicate that the terminal has successfully received the system information.

Optionally, the second sending module is configured to send RRC signaling to the base station; where the RRC signaling carries the first indication information;

or, the second sending module is configured to send MAC CE signaling to the base station, where the MAC CE signaling carries the first indication information.

Optionally, the device further includes:

a third receiving module, configured to receive an SI response sent by the base station; and a determining module; configured to, when the SI response does not carry the system information, or the SI response carries transmission indication information for indicating that the system information will be sent through broadcast, determine that the base station will send the system information through broadcast.

Optionally, the device further includes:

a BWP switching module, configured to switch from the first BWP to the second BWP, after completing reception of the system information on the first BWP.

Optionally, the device further includes:

a third sending module, configured to send second indication information to the base station, where the second indication information is used to indicate that the terminal switched to the second BWP.

Optionally, the device further includes:

a fourth receiving module, configured to receive second switching information sent by the base station, where the second switching information is used to instruct the terminal to switch to the first BWP to transmit data;

or, a fifth receiving module, configured to receive third switching information sent by the base station, where the third switching information is used to instruct the terminal to switch to a third. BWP to transmit data.

According to a fourth aspect of the present disclosure, there is provided a device for sending system information, applied to a base station, and the device includes:

a first receiving module, configured to receive an SI request sent by the terminal on a BWP, where the SI request is used to request to obtain system information;

a first sending module, configured to send first switching information to the terminal, where the first switching information is used to instruct the terminal to switch to a second BWP to receive the system information;

a second sending module, configured to send the system information on the second BWP through broadcast; and a second receiving module, configured to receive first indication information sent by the terminal, where the first indication information is used to indicate that the terminal has successfully received the system information.

Optionally, the first sending module is configured to send an SI response to the terminal; where the SI response carries the first switching information;

or, the first sending module is configured to send PDCCH scheduling information for scheduling the SI response to the terminal, where the PDCCH scheduling information carries the first switching information.

Optionally, the second sending module is configured to send the system information on the second BWP through broadcast after receiving second indication information sent by the terminal, where the second indication information is used to indicate the terminal switched to the second BWP.

Optionally, the device further includes:

a third sending module, configured to send second switching information to the terminal, where the second switching information is used to instruct the terminal to switch to the first BWP to transmit data;

or, a fourth sending module, configured to send third switching information to the terminal, where the third switching information is used to instruct the terminal to switch to a third BWP to transmit data.

According to a fifth aspect of the present disclosure, there is provided a device for receiving system information, applied to a terminal, and the device includes:

a processor; and a memory for storing executable instructions of the processor;

wherein the processor is configured to:

send an SI request to a base station on a BWP, where the SI request is used to request to obtain system information;

receive first switching information sent by the base station, where the first switching information is used to instruct the terminal to switch to a second BWP to receive the system information;

receive the system information on the second BWP; and send first indication information to the base station after successfully receiving the system information, where the first indication information is used to indicate that the terminal has successfully received the system information.

According to a sixth aspect of the present disclosure, there is provided a device for sending system information, applied to a base station, and the device includes:

a processor; and a memory for storing executable instructions of the processor;

wherein the processor is configured to:

receive an SI request sent by the terminal on a first bandwidth part BWP, where the SI request is used to request to obtain system information;

send first switching information to the terminal, where the first switching information is used to instruct the terminal to switch to a second BWP to receive the system information;

send the system information on the second BWP through broadcast; and receive first indication information sent by the terminal, where the first indication information is used to indicate that the terminal has successfully received the system information.

According to a seventh aspect of the present disclosure, there is provided a non-transitory computer-readable storage medium, with a computer program stored thereon, and when the computer program is executed by a processor, the computer program implements the steps of the method according to the first aspect or the steps of the method according to the second aspect.

The technical solutions provided by the examples of the present disclosure may include the following beneficial effects:

In the technical solutions provided by the examples of the present disclosure, when the system information requested by the terminal will not sent on the currently activated first BWP, but on the second BWP, the first switching information is sent to the terminal through the base station, so as to instruct the terminal to switch to the second BWP to receive the above system information, thus ensuring the success rate of the terminal receiving system information in the BWP scenario. In addition, after the terminal successfully receives the system information, the terminal sends the first instruction information to the base station, so as to indicate that the terminal has successfully received the system information, such that the base station can learn when the terminal completed the reception of the system information, and then provide assistance for BWP scheduling during subsequent data transmission.

It should be understood that the "plurality" mentioned herein refers to two or more. "And/or" describes the association relationship of the associated object, indicating that there can be three types of relationships, for example, A and/or B, which can mean: A alone exists, A and B exist at the same time, and B exists alone. The character "/" generally indicates that the associated objects before and after are in an "or" relationship.

Those skilled in the art will easily think of other examples of the present disclosure after considering the specification and practicing the invention disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the examples are to be regarded as exemplary only, and the true scope and spirit of the present disclosure are pointed out by the following claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. A method for receiving system information, comprising:

sending, by a terminal, a system information (SI) request to a base station on a first bandwidth part (BWP), wherein the SI request requests to obtain system information;

receiving, by the terminal, first switching information sent by the base station, wherein the first switching information instructs the terminal to switch to a second BWP to receive the system information; and in response to the system information requested by the terminal being sent on a plurality of second BWPs the first switching information comprises a mapping relationship, between identification information of the second BWPs and identification information of the system information, that indicates to the terminal which system information is received on any of the second BWPs;

receiving, by the terminal, the system information on the second BWP; and in response to successfully receiving the system information, sending, by the terminal, first indication information to the base station, wherein the first indication information indicates that the terminal has successfully received the system information.

2. The method according to claim 1, wherein sending, by the terminal, first indication information to the base station comprises:

sending, by the terminal, radio resource control (RRC) signaling to the base station, wherein the RRC signaling carries the first indication information;

or, sending, by the terminal, a media access control (MAC) control unit (CE) signaling to the base station, wherein the MAC CE signaling carries the first indication information.

3. The method according to claim 1, wherein the first switching information is sent to the terminal by the base station through sending an SI response, wherein the SI response carries the first switching information, or the first switching information is sent to the terminal by the base station through sending physical downlink control channel (PDCCH) scheduling information for scheduling the SI response, wherein the PDCCH scheduling information carries the first switching information.

4. The method according to claim 1, further comprising:

receiving, by the terminal, an SI response sent by the base station; and in response to determining that the SI response does not carry the system information, or the SI response carries transmission indication information for indicating that the system information will be sent through broadcast, determining, by the terminal, that the base station will send the system information through broadcast.

5. The method according to claim 1, further comprising:

switching, by the terminal, from the first BWP to the second BWP, after completing reception of the system information on the first BWP.

6. The method according to claim 1, further comprising:

sending, by the terminal, second indication information to the base station, wherein the second indication information indicates that the terminal switched to the second BWP.

7. The method according to claim 1, further comprising:

receiving, by the terminal, second switching information sent by the base station, wherein the second switching information instructs the terminal to switch to the first BWP to transmit data;

or, receiving, by the terminal, third switching information sent by the base station, wherein the third switching information instructs the terminal to switch to a third BWP to transmit data.

8. A method for sending system information, comprising:
receiving, by a base station, a system information (SI) request sent by a terminal on a first bandwidth part (BWP), wherein the SI request requests to obtain system information;
sending, by the base station, first switching information to the terminal, wherein the first switching information instructs the terminal to switch to a second BWP to receive the system information; and in response to the system information requested by the terminal being sent on a plurality of second BWPs, the first switching information comprises a mapping relationship, between identification information of the second BWPs and identification information of the system information, that indicates to the terminal which system information is received on any of the second BWPs;
sending, by the base station, the system information on the second BWP through broadcast; and
receiving, by the base station, first indication information sent by the terminal, wherein the first indication information indicates that the terminal has successfully received the system information.

9. The method according to claim 8, wherein sending, by the base station, first switching information to the terminal comprises:
sending, by the base station, an SI response to the terminal, wherein the SI response carries the first switching information;
or,
sending, by the base station, physical downlink control channel (PDCCH) scheduling information for scheduling the SI response, to the terminal, wherein the PDCCH scheduling information carries the first switching information.

10. The method according to claim 8, wherein sending, by the base station, the system information on the second BWP through broadcast comprises:
in response to receiving second indication information sent by the terminal, sending, by the base station, the system information on the second BWP through broadcast, wherein the second indication information indicates that the terminal switched to the second BWP.

11. The method according to claim 8, further comprising:
sending, by the base station, second switching information to the terminal, wherein the second switching information instructs the terminal to switch to the first BWP to transmit data;
or,
sending, by the base station, third switching information to the terminal, wherein the third switching information instructs the terminal to switch to a third BWP to transmit data.

12. A device for receiving system information, applied to a terminal, wherein the device comprises:
a processor; and
a memory for storing executable instructions of the processor;
wherein the processor is configured to:
send a system information (SI) request to a base station on a first bandwidth part (BWP), wherein the SI request requests to obtain system information;
receive first switching information sent by the base station, wherein the first switching information instructs the terminal to switch to a second BWP to receive the system information;
and in response to the system information requested by the terminal being sent on a plurality of second BWPs, the first switching information comprises a mapping relationship, between identification information of the second BWPs and identification information of the system information, that indicates to the terminal which system information is received on any of the second BWPs;
receive the system information on the second BWP; and
send first indication information to the base station in response to successfully receiving the system information, wherein the first indication information indicates that the terminal has successfully received the system information.

13. A device for sending system information, applied to a base station, wherein the device comprises:
a processor; and
a memory for storing executable instructions of the processor;
wherein the processor is configured to:
receive a system information (SI) request sent by the terminal on a first bandwidth part (BWP), wherein the SI request requests to obtain system information;
send first switching information to the terminal, wherein the first switching information instructs the terminal to switch to a second BWP to receive the system information; and in response to the system information requested by the terminal being sent on a plurality of second BWPs, the first switching information comprises a mapping relationship, between identification information of the second BWPs and identification information of the system information that indicates to the terminal which system information is received on any of the second BWPs;
send the system information on the second BWP through broadcast; and
receive first indication information sent by the terminal, wherein the first indication information indicates that the terminal has successfully received the system information.

14. The device according to claim 12, wherein the processor is further configured to:
send radio resource control (RRC) signaling to the base station, wherein the RRC signaling carries the first indication information;
or,
send media access control (MAC) control unit (CE) signaling to the base station, wherein the MAC CE signaling carries the first indication information.

15. The device according to claim 12, wherein the processor is further configured to:
receive an SI response sent by the base station; and
in response to determining that the SI response does not carry the system information, or the SI response carries transmission indication information for indicating that the system information will be sent through broadcast, determine that the base station will send the system information through broadcast.

16. The device according to claim 12, wherein the processor is further configured to:
switch from the first BWP to the second BWP, in response to completing reception of the system information on the first BWP.

17. The device according to claim 12, wherein the processor is further configured to:
send second indication information to the base station, wherein the second indication information indicates that the terminal switched to the second BWP.

18. The device according to claim 12, wherein the processor is further configured to:
receive second switching information sent by the base station, wherein the second switching information instructs the terminal to switch to the first BWP to transmit data;
or,
receive third switching information sent by the base station, wherein the third switching information instructs the terminal to switch to a third BWP to transmit data.

19. The device according to claim 13, wherein the processor is further configured to:
send an SI response to the terminal, wherein the SI response carries the first switching information;
or,
send physical downlink control channel (PDCCH) scheduling information for scheduling the SI response to the terminal, wherein the PDCCH scheduling information carries the first switching information.

20. The device according to claim 13, wherein the processor is further configured to:
send the system information on the second BWP through broadcast after receiving second indication information sent by the terminal, wherein the second indication information indicates the terminal switched to the second BWP.

21. The device according to claim 13, wherein the processor is further configured to:
send second switching information to the terminal, wherein the second switching information instructs the terminal to switch to the first BWP to transmit data;
or,
send third switching information to the terminal, wherein the third switching information instructs the terminal to switch to a third BWP to transmit data.

* * * * *